United States Patent Office 3,754,005
Patented Aug. 21, 1973

3,754,005
THIAXANTHENE DERIVATIVES
Stuart Sanders Adams, Bernard John Armitage, Norman William Bristow, and Bernard Vincent Heathcote, Nottingham, England, assignors to The Boots Company Limited, Nottingham, England
No Drawing. Filed Oct. 20, 1971, Ser. No. 191,111
Claims priority, application Great Britain, Sept. 2, 1966, 39,384/66; Apr. 5, 1967, 15,692/67
Int. Cl. A61k 27/00; C07d 65/16
U.S. Cl. 260—328
3 Claims

ABSTRACT OF THE DISCLOSURE

N - hydroxy-N-9-thiaxanthenylurea and its esters and substituted derivatives thereof useful in the treatment of peptic ulcer.

---

This application is a continuation-in-part of U.S. patent application S.N. 662,587 filed on Aug. 23, 1967, now U.S. Pat. No. 3,644,420, patented Feb. 22, 1972, the disclosure of which is incorporated herein by reference.

According to the present invention there are provided compounds of Formula I

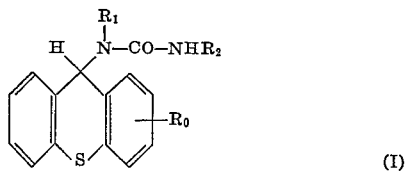

in which
$R_0$ is hydrogen, halogen, alkyl or alkoxy;
$R_1$ is hydroxy or alkanoyloxy; and
$R_2$ is hydrogen or alkyl.

and wherein the terms "alkyl," "alkoxy" and "alkanoyloxy" indicate such groups containing up to 7 carbon atoms.

Methods for the preparation of the compounds of Formula I are described in detail in our aforementioned U.S. patent application S.N. 662,587 now U.S. Pat. No. 3,644,420, patented Feb. 22, 1972.

It has been found that compounds of Formula I are anti-secretory agents, with a specific activity against gastric secretion and without any anticholinergic activity. The anti-secretory activity has been demonstrated in the stimulated, pylorus-ligated rat, and varies with the values of $R_0$, $R_1$ and $R_2$.

The compounds of the invention may be administered orally, rectally or parenterally, preferably orally, the optimum dosage rate varying with the activity of the compounds. A preferred dosage rate for oral administration is of the order of 0.025–2 g. daily, optionally in divided doses.

In use, the compounds of the invention are administered in conventional formulations, and therefore, according to a further aspect of the invention there are provided therapeutic compositions which comprise a compound of the hereinbefore described Formula I in association with pharmaceutical excipients known for the production of compositions suitable for oral, rectal or parenteral administration.

The compositions of the invention preferably contain 0.1–90% by weight of a compound of Formula I.

Compositions for oral administration are the preferred compositions of the invention, and these are the known pharmaceutical forms for such administration, such as for example tablets, capsules, syrups and aqueous and oily suspensions. The excipients used in the preparation of these compositions are the excipients known in the pharmacist's art. Preferred compositions are tablets wherein a compound of Formula I is mixed with an inert diluent such as calcium phosphate in the presence of disintegrating agents e.g. maize starch and lubricating agents e.g. magnesium stearate. Such tablets may, if desired, be provided with enteric coatings by known methods, for example by the use of cellulose acetate phthalate. Similarly capsules, for example hard or soft gelatin capsules, containing a compound of Formula I, with or without other excipients, may be prepared by conventional means and, if desired, provided with enteric coatings in known manner. The tablets and capsules may conveniently each contain 25–500 mg. of a compound of Formula I. Other compositions for oral administration include for example aqeuous suspensions containing a compound of Formula I in aqueous media in the presence of a non-toxic suspending agent e.g. sodium carboxymethylcellulose and dispersing agents, and oily suspensions containing a compound of Formula I in a vegetable oil for example arachis oil.

Compositions of the invention suitable for rectal administration are the known pharmaceutical forms for such administration, such as for example suppositories with coca butter or polyethylene glycol bases.

Compositions of the invention suitable for parenteral administration are the known pharmaceutical forms for such administration, for example sterile suspensions in aqueous and oily media or sterile solutions in propylene glycol.

In the compositions of the invention the compounds of Formula I may if desired be associated with other compatible pharmacologically active ingredients. For example antacids and acid absorbents such as aluminum hydroxide and magnesium trisilicate may be included in compositions for oral administration to give an immediate antacid effect. Other pharmacologically active agents which may be associated with the compounds of Formula I include compounds active on the central nervous system, including short and long acting sedatives such as the barbiturates and methaqualone, antihistaminic and/or antiemetic agents such as cyclizine and diphenhydramine, and anticholinergic agents such as atropine.

Milk and milk solids are valuable in the treatment of peptic ulcer, and the compositions of the invention include liquid and solid compositions based on milk and milk solids.

In some formulations it may be beneficial to use the compounds of Formula I in the form of particles of very small size, such as for example, as obtained by fluid energy milling.

According to another aspect of the invention there is provided a method of treating peptic ulcer which comprises administering to a patient 0.025–2 grams daily of a compound of Formula I; in a preferred embodiment of this aspect of the invention, administration is by the oral route.

The starting materials employed in the preparation of compounds of Formula I are in many cases known compounds; where they are new, they are prepared by methods analagous to those employed for known compounds, and as such will be apparent to those skilled in the art. By way of example the preparation of some new intermediates is given below.

PREPARATION 1

A mixture of thiaxanthydrol (21.4 g.), hydroxyammonium chloride (10 g.), and dry pyridine (75 ml.), was left overnight at room temperature and then poured into ice/water (1 litre). The resulting suspension was decanted from yellow gum, the solid collected on a filter, and recrystallised from chloroform/petroleum ether B.P. 40–60° C. to give N-9-thiaxanthenylhydroxylamine, M.P. >150° C.

In a similar manner the following compounds are prepared:

N-1-fluoro-9-thiaxanthenylhydroxylamine, M.P. 162° C.
N-2-methyl-9-thiaxanthenylhydroxylamine, M.P. 160° C.

The following non-limitative examples illustrate the invention.

EXAMPLE 1

A mixture of thiaxanthydrol (3.2 g.), hydroxyurea (1.15 g.), and a mixture (50 ml.) of equal parts by volume of ethanol and glacial acetic acid was stirred overnight at room temperature. The N-hydroxy-N,N'-di-9-thiaxanthenylurea which separated was filtered off. Dilution of the filtrate with ice/water precipitated N-hydroxy-N-9-thiaxanthenylurea which had M.P. 173–175° C. after recrystallisation from chloroform/light petroleum B.P. 40–60° C.

In a similar manner the following compounds are prepared:

N-hydroxy-N-(2-methyl-9-thiaxanthenyl)urea, M.P. 143–145° C.
N-(2-chloro-9-thiaxanthenyl)-N-hydroxyurea, M.P. 167–168° C.
N-(1-fluoro-9-thiaxanthenyl)-N-hydroxyurea, M.P. 182–184° C.
N-hydroxy-N-(2-methoxy-9-thiaxanthenyl)urea, as an acetone solvate, M.P. 108–112° C.

EXAMPLE 2

A suspension of N-9-thiaxanthenylhydroxylamine (2.3 g.) in methylene chloride (20 ml.) was treated with methyl isocyanate (0.8 ml.). After 30 minutes the mixture was diluted with light petroleum B.P. 40–60° C. (100 ml.). The resulting precipitate was recrystallised from chloroform/light petroleum B.P. 40–60° C. to give N-hydroxy-N'-methyl-N-9-thiaxanthenylurea, M.P. 165° C.

In a similar manner the following compounds are prepared:

N'-ethyl-N-hydroxy-N-9-thiaxanthenylurea, as a hydrate, M.P. 157–159° C.
N-hydroxy-N'-propyl-N-9-thiaxanthenylurea, M.P. 128–129° C.
N'-butyl-N-hydroxy-N-9-thiaxanthenylurea, M.P. 111–112° C.
N-(1-fluoro-9-thiaxanthenyl)-N-hydroxy-N'-methylurea, M.P. 180° C.
N'-ethyl-N-(1-fluoro-9-thiaxanthenyl)-N-hydroxyurea, M.P. 155° C.
N-(1-fluoro-9-thiaxanthenyl)-N-hydroxy-N'-propylurea, M.P. 155° C.
N-(2-chloro-9-thiaxanthenyl)-N-hydroxy-N'-methylurea, M.P. 160° C.
N-hydroxy-N-(2-methoxy-9-thiaxanthenyl)-N'-methylurea, M.P. 154° C.
N-hydroxy-N'-methyl-N-(2-methyl-9-thiaxanthenyl)urea, as a chloroform solvate, M.P. 145–147° C.

EXAMPLE 3

A suspension of N-hydroxy-N-9-thiaxanthenylurea (0.9 g.) in dry pyridine (9 ml.) at 0° C. was treated with 4-dimethylaminopyridine (25 mg.) and propionic anhydride (0.65 ml.), the temperature of the reaction mixture being maintained at 0–4° C. during addition and for a further 20 hours. The mixture was then poured onto ice (300 g.) and the resulting precipitate recrystallised from ethyl acetate to give N-propionyloxy-N-9-thiaxanthenylurea, M.P. 173° C.

In a similar manner the following compounds are prepared:

N-acetoxy-N-9-thiaxanthenylurea, M.P. 167–168° C.
N-butyryloxy-N-9-thiaxanthenylurea, M.P. 173–174° C.
N-isobutyryloxy-N-9-thiaxanthenylurea, M.P. 148–149° C.
N-acetoxy-N'-methyl-N-9-thiaxanthenylurea, M.P. 163–164° C.
N'-methyl-N-propionyloxy-N-9-thiaxanthenylurea, M.P. 169–170° C.
N-butyryloxy-N'-methyl-N-9-thiaxanthenylurea, M.P. 160–161° C.
N-acetoxy-N'-ethyl-N-9-thiaxanthenylurea, M.P. 166–167° C.
N'-ethyl-N-propionyloxy-N-9-thiaxanthenylurea, M.P. 153–154° C.
N-butyryloxy-N'-ethyl-N-9-thiaxanthenylurea, as a chloroform solvate, M.P. 151–153° C.
N-acetoxy-N'-propyl-N-9-thiaxanthenylurea, M.P. 158–159° C.
N-propionyloxy-N'-propyl-N-9-thiaxanthenylurea, M.P. 161–162° C.
N-butyryloxy-N'-propyl-N-9-thiaxanthenylurea, M.P. 154–155° C.
N-acetoxy-N'-butyl-N-9-thiaxanthenylurea, M.P. 165–166° C.
N-acetoxy-N-(2-methoxy-9-thiaxanthenyl)urea, M.P. 163° C.
N-acetoxy-N-(2-methyl-9-thiaxanthenyl)urea, as a hydrate, M.P. 174.5° C.
N-acetoxy-N-(1-fluoro-9-thiaxanthenyl)urea, M.P. 207° C.
N-acetoxy-N-(2-chloro-9-thiaxanthenyl)urea, M.P. 166–168° C.

EXAMPLE 4

In the preparation of tablets, mixtures of the following type may be tabletted in conventional manner:

| | Percent by weight |
|---|---|
| Compound of Formula I | 10–90 |
| Calcium phosphate | 0–80 |
| Maize starch | 5–10 |
| Magnesium stearate | ca. 1 |
| Microcrystalline cellulose | 0–90 |

EXAMPLE 5

The following mixture was formed into tablets in conventional manner, each tablet containing 50 mg. of active ingredient:

| | Percent by weight |
|---|---|
| N-hydroxy-N-9-thiaxanthenylurea | 25 |
| Maize starch | 10 |
| Calcium phosphate | 20 |
| Magnesium stearate | 1 |
| Microcrystalline cellulose | To 100 |

EXAMPLE 6

In the preparation of enteric coated tablets, tablets prepared as described in Example 5 were coated with sanderac varnish and then coated with cellulose acetate phthalate using a solution of 20% cellulose acetate phthalate and 3% diethyl phthalate in a mixture of equal parts of industrial alcohol and acetone.

EXAMPLE 7

In the preparation of tablets, the following mixture was dry granulated and compressed in a tabletting machine to give tablets containing 5 mg. of active ingredient:

| | G. |
|---|---|
| N-hydroxy-N-9-thiaxanthenylurea | 10 |
| Lactose | 5 |
| Calcium phosphate | 5 |
| Maize starch | 5 |

EXAMPLE 8

In the preparation of enteric coated tablets, the tablets described in Example 7 were given a thin coat of shellac followed by 20 coats of cellulose acetate phthalate.

EXAMPLE 9

In the preparation of capsules, a mixture of the ingredients described in Example 7 was encapsulated in hard gelatin capsules. Enteric coating was applied by conventional dipping in cellulose acetate phthalate.

EXAMPLE 10

The following mixture was compressed into tablets in the conventional manner:

| | Percent |
|---|---|
| N-hydroxy-N-9-thiaxanthenylurea | 25 |
| Sodium bicarbonate | 75 |
| Peppermint oil q.s. | |

EXAMPLE 11

In the preparation of capsules, a mixture of equal parts by weight of N-hydroxy-N-9-thiaxanthenylurea and calcium phosphate was encapsulated in hard gelatin capsules, each capsule containing 50 mg. of N-hydroxy-N-9-thiaxanthenylurea.

EXAMPLE 12

In the preparation of enteric coated capsules, the capsules of Example 11 were coated with cellulose acetate phthalate in conventional manner.

EXAMPLE 13

Suppositories weighing 1 g. and containing 50 mg. of N-hydroxy-N-9-thiaxanthenylurea were prepared in conventional manner using a base consisting of:

| | Percent |
|---|---|
| Polyethylene glycol 4000 | 33 |
| Polyethylene glycol 6000 | 47 |
| Water | 20 |

EXAMPLE 14

A solution for parenteral administration was prepared by dissolving 100 mg. of N-hydroxy-N-9-thiaxanthenylurea in 2 ml. of propylene glycol and sterilised by filtration.

Compositions similar to those described in Examples 4–14 were prepared, containing the other preferred compounds described previously in place of N-hydroxy-N-9-thiaxanthenylurea.

We claim:

1. A compound represented by the Formula I

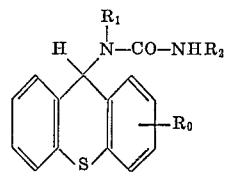

in which $R_0$ is selected from the group consisting of hydrogen, halogen, alkyl and alkoxy;

$R_1$ is selected from the group consisting of hydroxy and alkanoyloxy; and $R_2$ is selected from the group consisting of hydrogen and alkyl;

and wherein the terms "alkyl," "alkoxy" and "alkanoyloxy" indicate such groups containing up to 7 carbon atoms.

2. A compound as claimed in claim 1 and of the formula

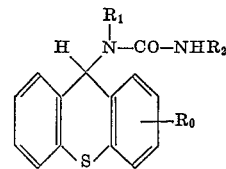

in which $R_0$ is selected from the group consisting of hydrogen and alkoxy;

$R_1$ is hydroxy; and $R_2$ is selected from the group consisting of hydrogen and alkyl.

3. A compound in accordance with claim 1 which is N-hydroxy-N-9-thiaxanthenylurea.

References Cited

UNITED STATES PATENTS 3,644,420   2/1972   Adams et al. _____ 260—335

HENRY R. JILES, Primary Examiner

C. M. S. JAISLE, Assistant Examiner

U.S. Cl. X.R.

424—275